Figure 4:
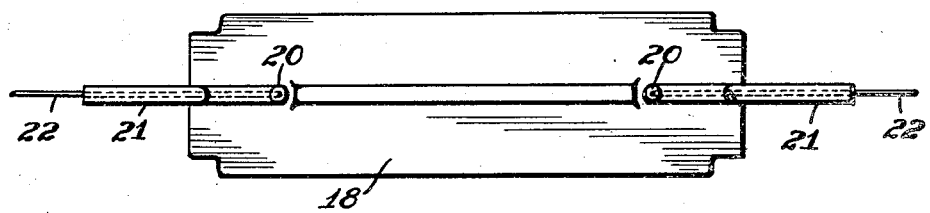

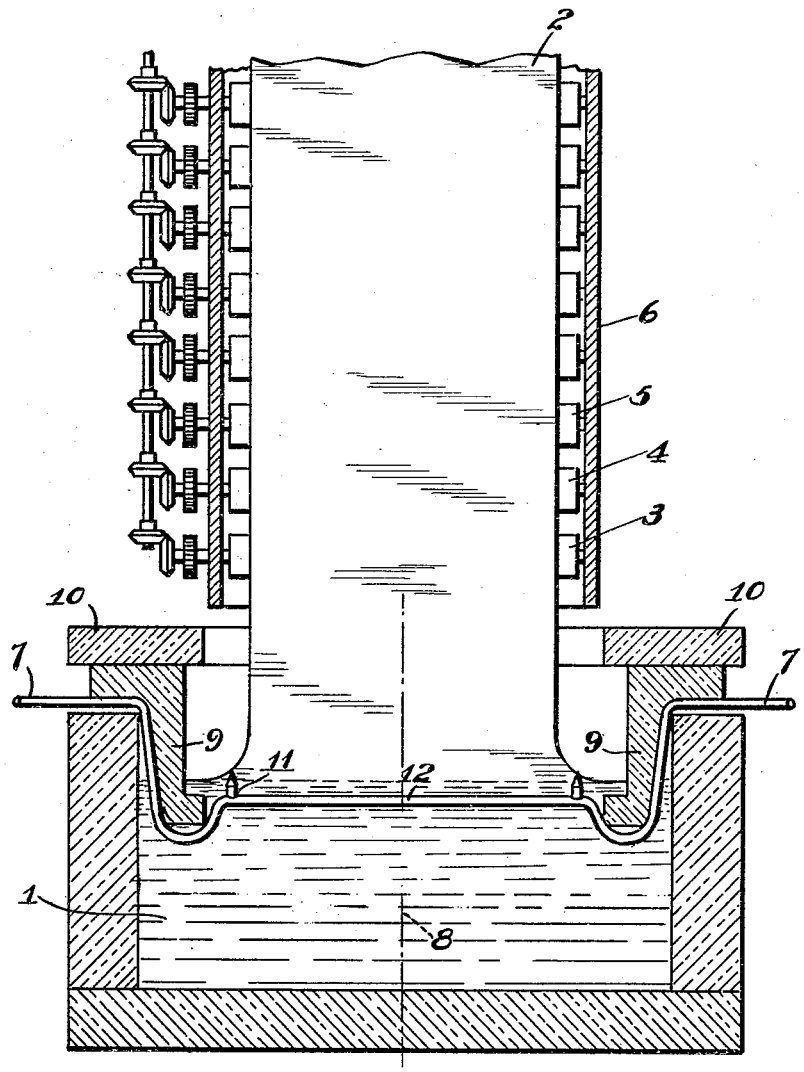

Aug. 11, 1931.  H. L. HALBACH  1,818,130

APPARATUS FOR MAKING GLASS SHEETS

Filed Dec. 14, 1927   2 Sheets-Sheet 2

INVENTOR
Howard L. Halbach
by
James C. Bradley
atty.

Patented Aug. 11, 1931

1,818,130

UNITED STATES PATENT OFFICE

HOWARD L. HALBACH, OF CLARKSBURG, WEST VIRGINIA, ASSIGNOR TO PITTSBURGH PLATE GLASS COMPANY, A CORPORATION OF PENNSYLVANIA

APPARATUS FOR MAKING GLASS SHEETS

Application filed December 14, 1927. Serial No. 239,953.

Figure 5:
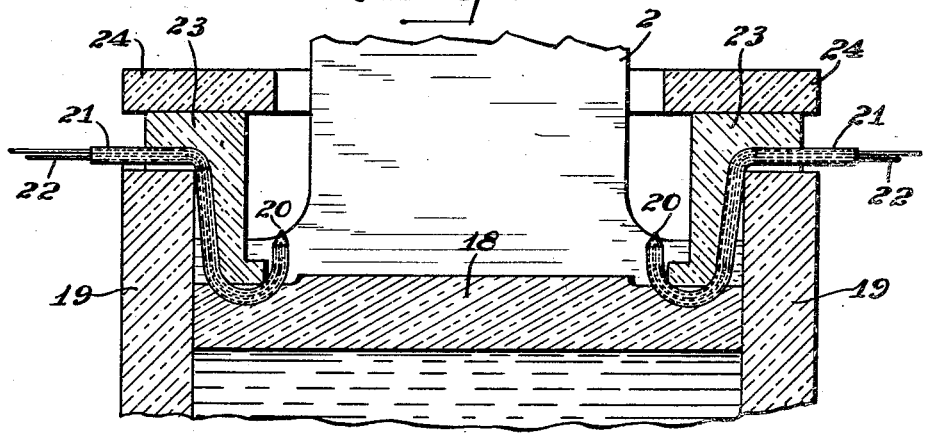
Figure 2:
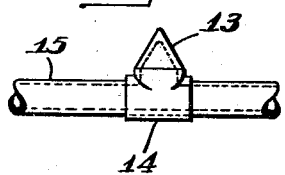
Figure 3:

The invention relates to apparatus for making glass sheets applicable where a continuous sheet is drawn from an open pool or bath, and has to do particularly with the holding of the edges of the sheet being drawn against inward movement, as the drawing progresses. The invention has for its principal objects the provision of improved and simplified means for accomplishing the function specified; which will hold the edges securely; and which will avoid producing any undue chilling action in the edges of the sheet introducing strain and causing breakage. Certain embodiments of the invention are illustrated in the accompanying drawings, wherein:

Figure 1 is a vertical section through the apparatus. Figs. 2 and 3 are fragmentary detail views showing modifications. And Figs. 4 and 5 are views showing a modification, Fig. 4 being a plan view, and Fig. 5 a longitudinal vertical section.

Referring to the drawings, 1 is a forehearth or drawing tank, connected with a melting tank, preferably of the regenerator type, from which the glass sheet or ribbon 2 is drawn continuously. The means employed for drawing the glass sheet preferably comprises a series of rolls 3, 4, 5, etc. driven by suitable means, and made up, either of asbestos discs or of central supporting members covered with asbestos. The rolls are mounted in a suitable casing 6 and are driven by shafts and gearing, as illustrated, such driving means being well-known in the art.

Extending transversely of the sheet 2 beneath the line of generation thereof, is a pipe 7, which is fluid cooled in any desired manner, such as by causing a flow of water therethrough. Any suitable circulating system may be employed, and may be so arranged that the cooling effect is uniform on both sides of the center line 8 of the sheet.

In order to prevent too great chilling of the glass at the side edges of the tank, where the glass is normally at a lower temperature than at the center of the bath, the shielding members 9, 9 of refractory material are provided, such members extending a substantial distance below the surface of the glass as illustrated. Carried upon the shielding blocks 9, 9 are the shade blocks 10, 10 also of refractory material which can be adjusted in and out to give a regulation of the temperature of the glass in the bath below the inner ends of such blocks. If the glass at the edges becomes too cool, these blocks are adjusted inward so that the reflected heat upon the surface of the glass at the edges of the bath is increased, and if a cooling effect is required at the edges of the sheet, these shade blocks are adjusted outward. The use of shade blocks of this character is another feature which is well-known in the art. The holding means for the edges of the sheet comprises the upwardly projecting members 11, 11 preferably of metal and secured to the wall of the pipe 7 in any suitable manner. As shown in Fig. 1, these members are solid, but as later described, these members may be made hollow and supplied with a cooling fluid, if a greater chilling effect is desired. The tips of these members preferably extend a slight distance above the top surface of the glass, and during the drawing operation, these tips give an anchorage for the side edges of the sheet 2, so that such edges are securely held in position during any desired period of drawing. The pipe 7 not only serves as a support for the holding members 11, 11 and as a means for cooling such members, but also acts to chill the body of glass lying above the central section 12 of the pipe. As a result of this cooling effect, the speed of drawing of the sheet 2 may be substantially increased over the speed which is possible when no cooling device of this kind is used. In operation, the pipe becomes covered by a coating of chilled glass, this body of chilled glass, after reaching a certain amount ceases to accumulate further so that a uniform cooling effect is secured after a given period of drawing in which the chilling effect slowly decreases.

Figs. 2 and 3 illustrate modified arrangements for chilling the upstanding edge holding members. In the Fig. 2 construction, the conical member 13 is carried by the T 14 upon the pipe 15 and is made hollow, so that the chilling effect of the fluid in the pipe 15 is increased, as compared with such chilling effect in the Fig. 1 construction, wherein the members 11, 11 are solid. In Fig. 3, the edge holding member 16 carried by the pipe 17 is in the form of a U through which the water from the pipe 17 is circulated.

Figs. 4 and 5 illustrate a modification in which the central section 12 of the pipe, shown in Fig. 1, is dispensed with and in place of such pipe, the regulation draw bar 18 of clay is used. In this case, the draw bar serves to give the necessary cooling effect upon the body of glass lying between the edge holding members from which the sheet is drawn. This bar may be of any desired construction and is supported at its ends in the side walls 19 of the forehearth. The edge holding members 20, 20 are carried by the separate pipes 21, 21. The cooling is preferably effected in each case by a smaller pipe 22, which extends into the pipe 21 to a point adjacent the end tip 20 and then returns, thus giving a complete circulation of the cooling fluid through the pipe 21. As in the previous construction, shields 23 are employed to cut down the chilling effect of the pipes upon the glass at the extreme edges of the tank and suitable shade bars 24 are mounted upon the tops of these shields, as in the Fig. 1 construction. I have found that the use of this type of edge holding device chills the edges of the sheet being drawn a minimum amount, so that any undue hardening of such edges and consequent breakage is avoided and a very smooth edge is produced. The thickness of this edge can be regulated by a vertical adjustment of the edge holding members and by varying the amount of cooling fluid which is supplied to the pipes to chill the edge holding members. An edge may be produced which is considerably thicker than the sheet or one which is only substantially the same thickness as the sheet, itself.

What I claim is:

1. In combination with apparatus arranged to draw a glass sheet from a pool of molten glass, means for chilling the glass below the line of generation of the sheet comprising a fluid cooled pipe extending across the bath beneath the line of generation of the sheet, and edge holding means comprising a pair of upwardly extending members carried by the pipe and terminating at the points where the edges of the sheet are drawn from the molten body.

2. In combination with apparatus arranged to draw a glass sheet from a pool of molten glass, means for chilling the glass below the line of generation of the sheet comprising a fluid cooled pipe extending across the bath beneath the line of generation of the sheet, and edge holding means comprising a pair of upwardly extending metal members carried by the pipe and terminating at the points where the edges of the sheet are drawn from the molten body.

3. In combination with apparatus arranged to draw a glass sheet from a pool of molten glass, in a tank means for preventing inward movement of the edge of the sheet comprising a pipe extending inward from the side of the tank beneath the level of the glass, means on the pipe extending upward to the surface of the glass, at the point at which the edge is drawn from the glass, means for cooling the pipe, and a refractory shield for the pipe above the portion of the pipe lying between said member and the side of the tank, said shield being extended down to a substantial distance below the surface of the glass.

4. In combination with apparatus arranged to draw a glass sheet from a pool of molten glass in a tank, a pipe extending transversely of the tank beneath the surface of the glass adjacent to such surface, said pipe having its end portions extended upwardly at the side walls of the tank and then laterally thereof, and refractory shielding means supported on the side walls of the tank and lying between the upwardly extending end portions of the pipe and the side edges of the glass sheet which is drawn from the bath, said shielding means being extended down to a substantial distance below the surface of the glass.

In testimony whereof, I have hereunto subscribed my name this 8th day of Nov., 1927.

HOWARD L. HALBACH.